6 Sheets—Sheet 1.
A. SHOGREN.
MACHINE FOR MAKING MACHINERY KEYS.
No. 186,439. Patented Jan. 23, 1877.
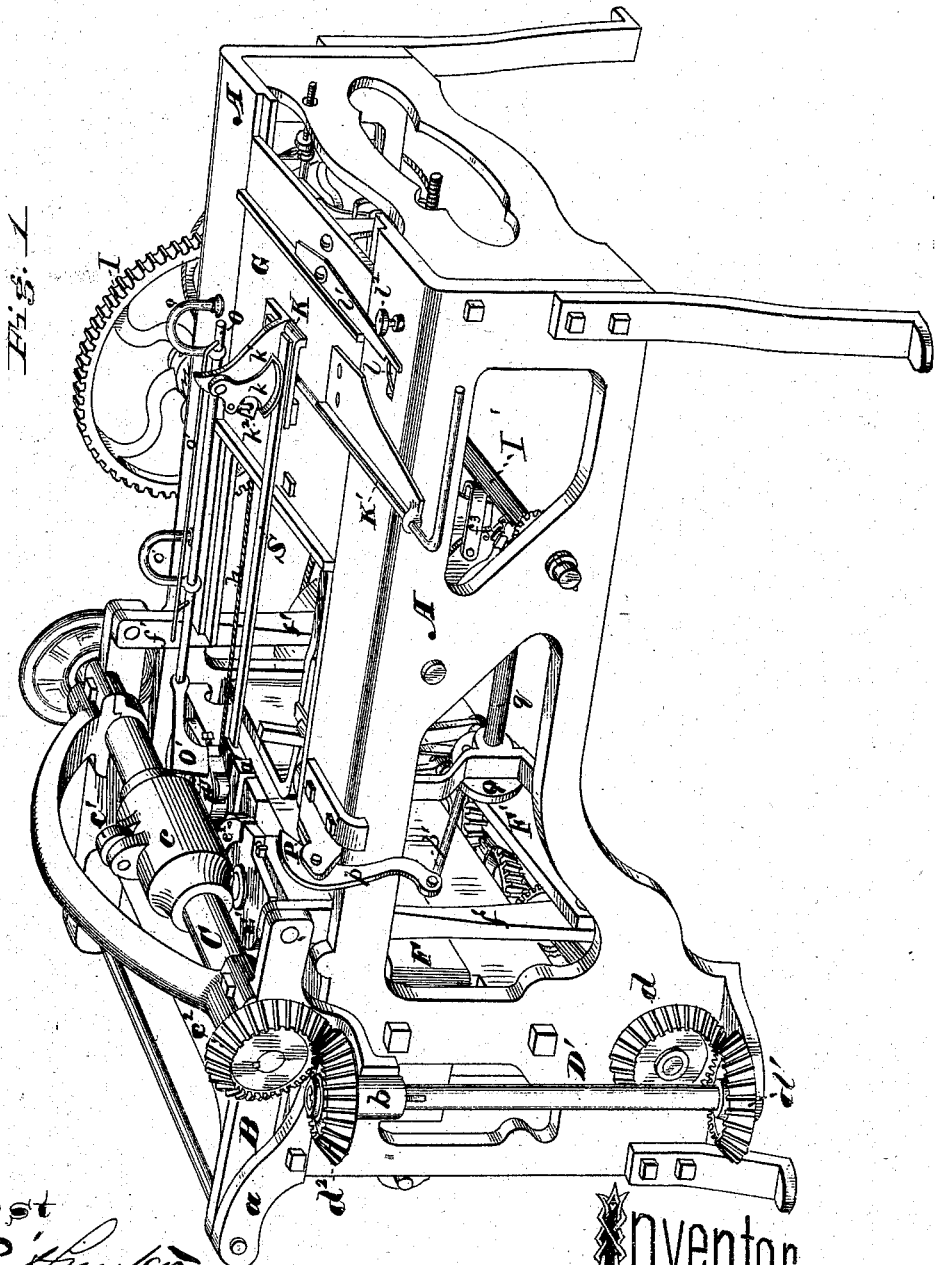

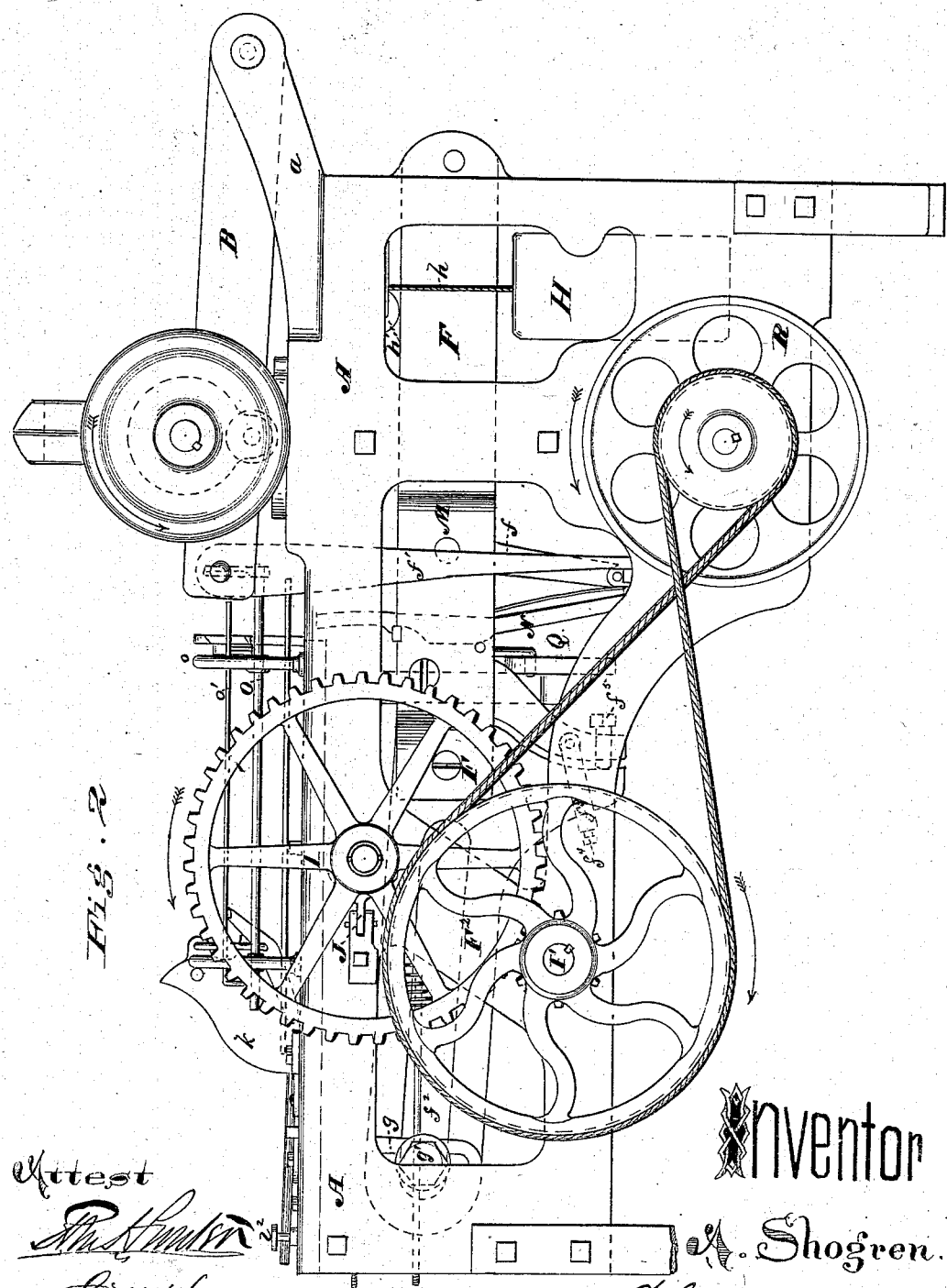

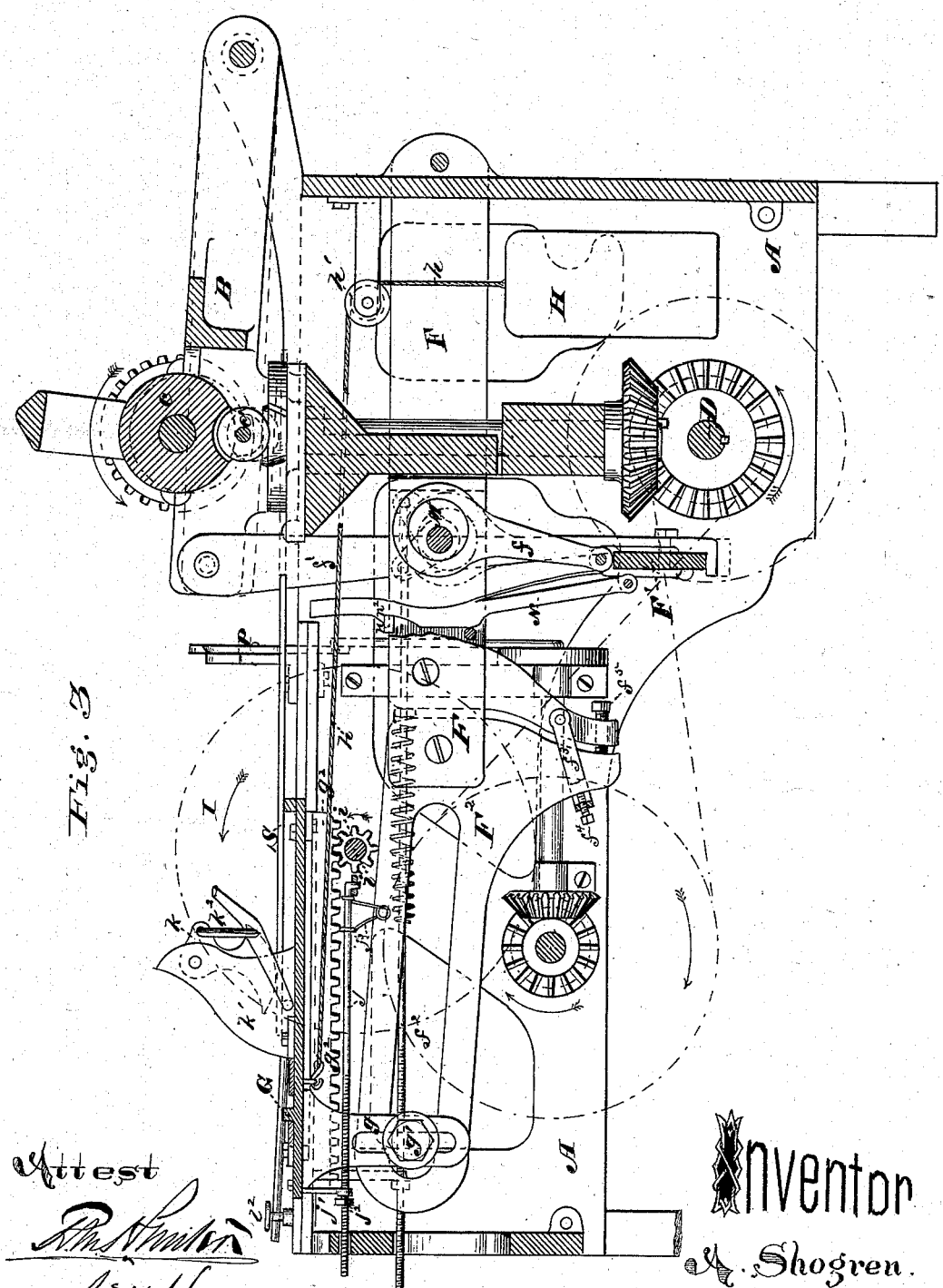

A. SHOGREN.
MACHINE FOR MAKING MACHINERY KEYS.
No. 186,439. Patented Jan. 23, 1877.
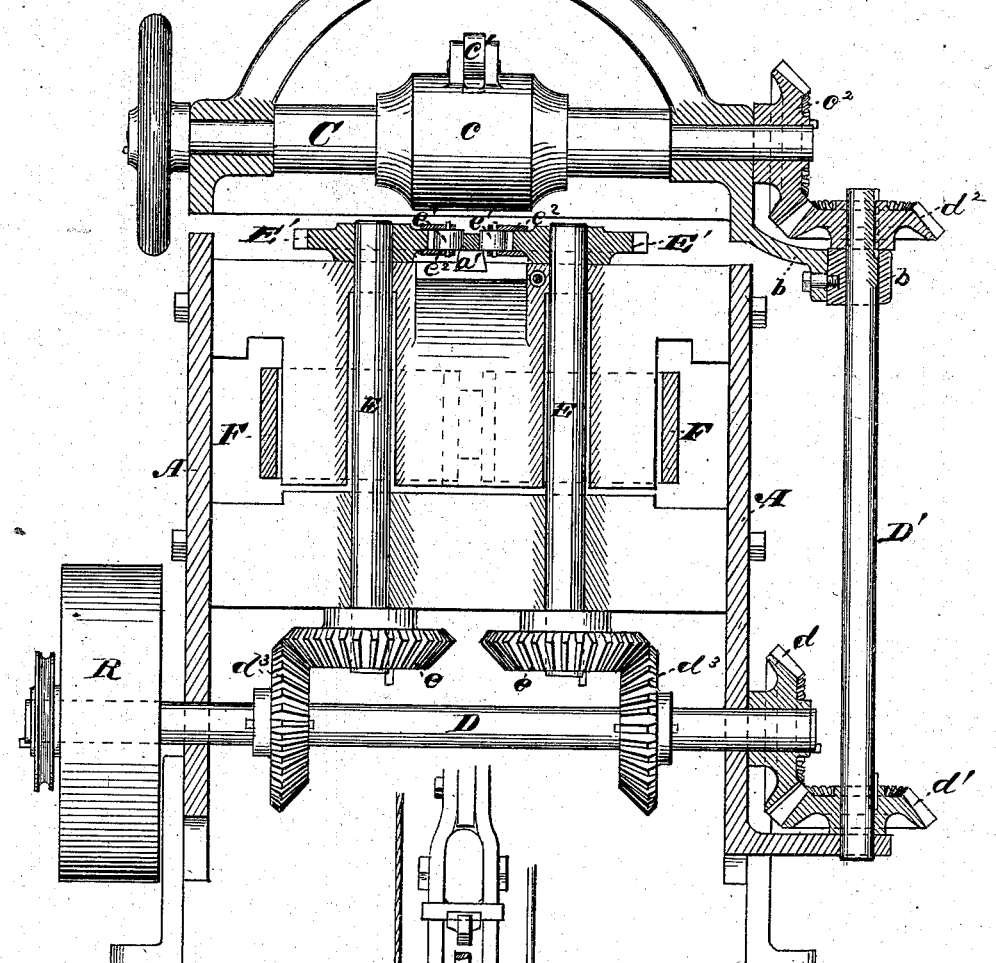
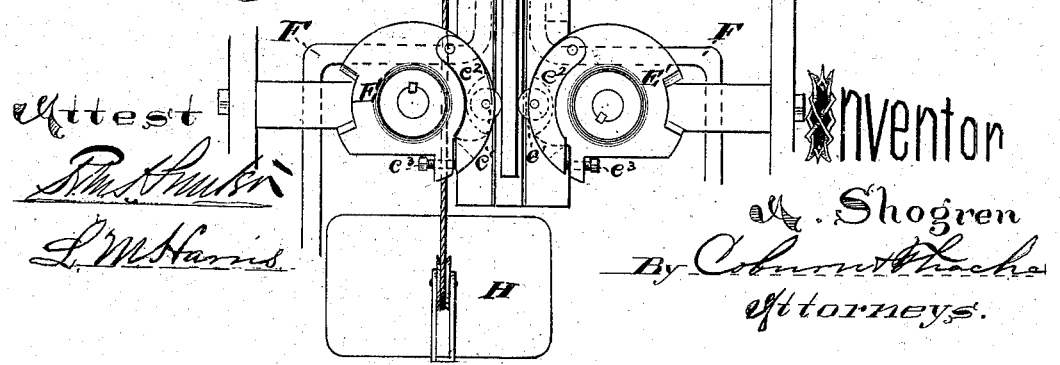

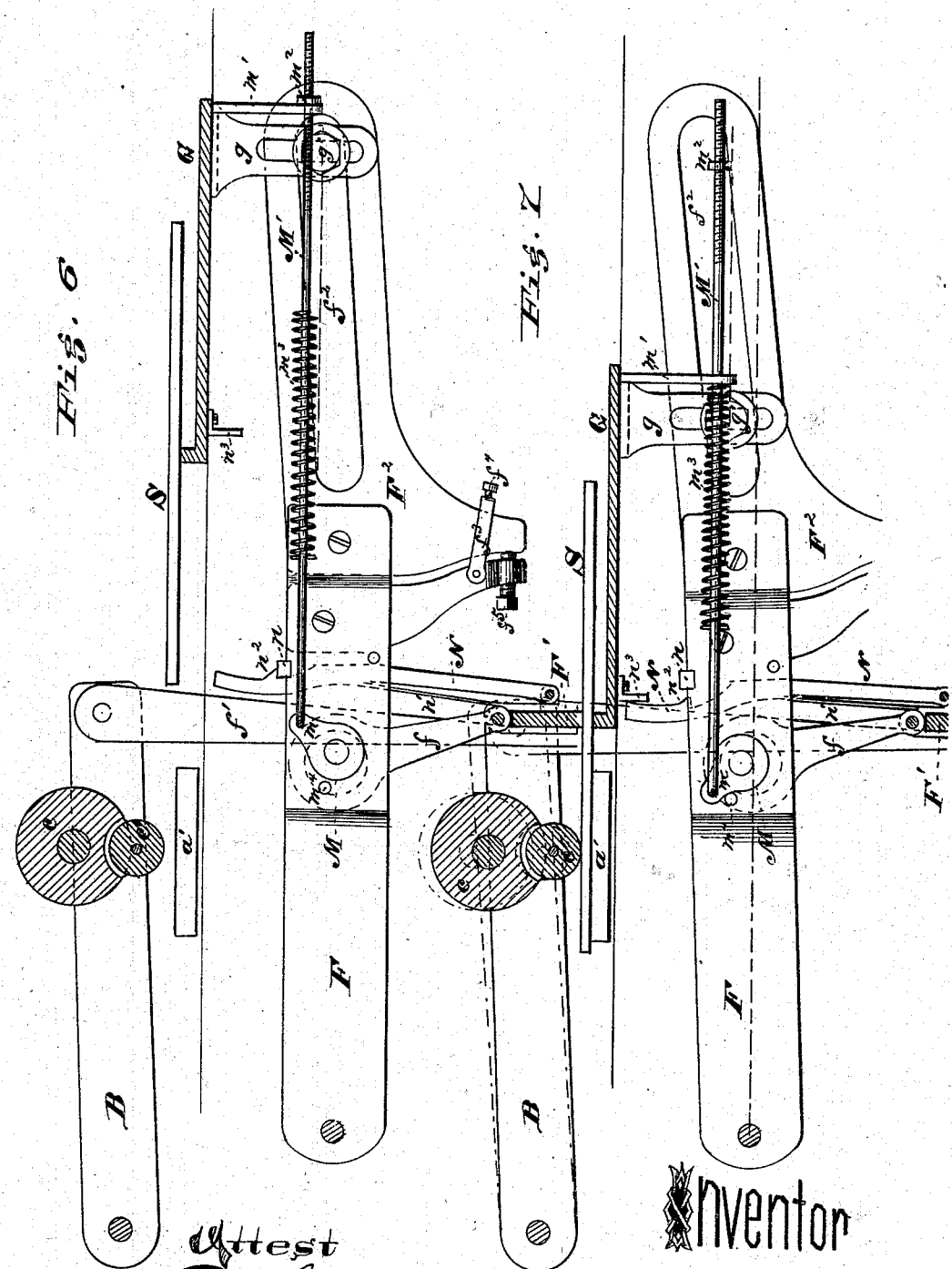

A. SHOGREN.
MACHINE FOR MAKING MACHINERY KEYS.
No. 186,439. Patented Jan. 23, 1877.
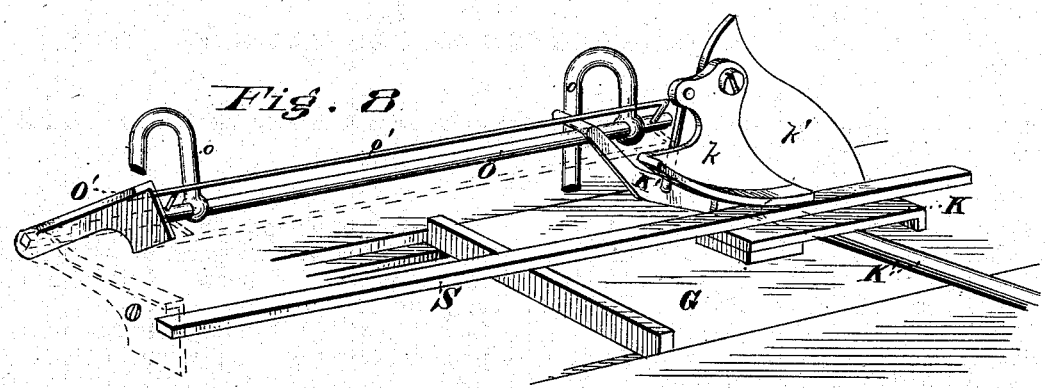
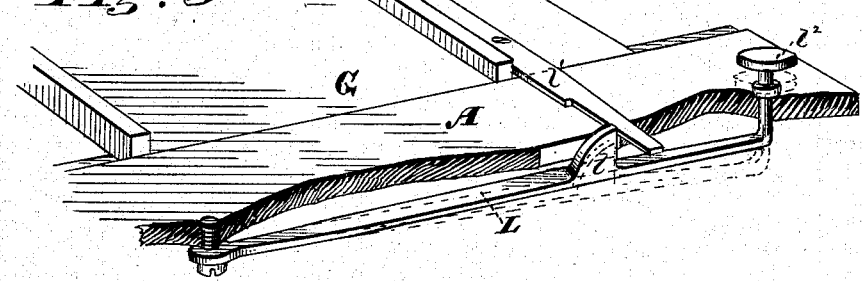
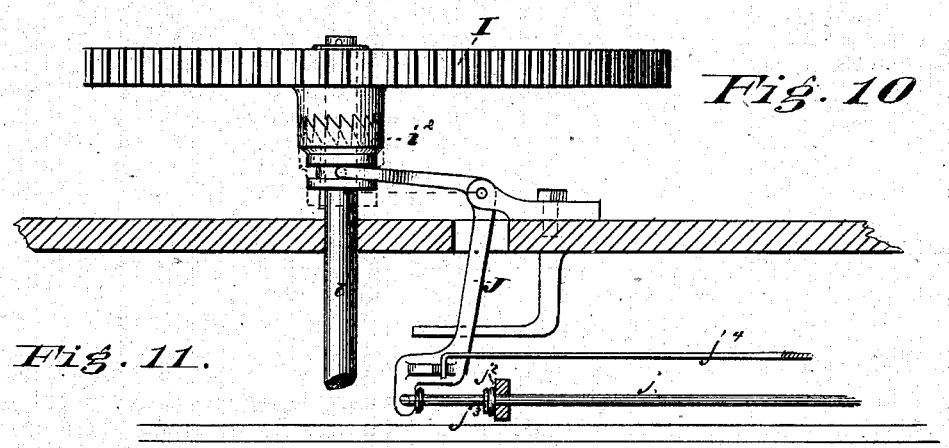
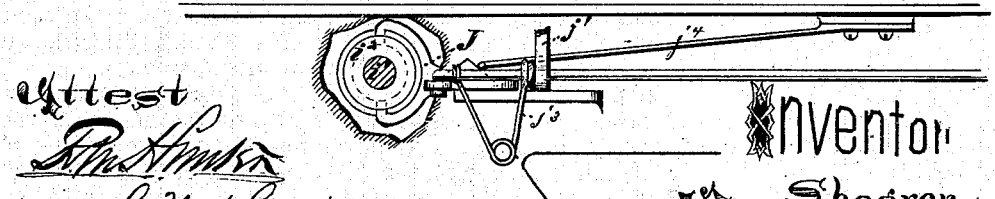
Attest
Inventor
A. Shogren.
By Coburn & Thacher
Attorneys.

UNITED STATES PATENT OFFICE.

ANDREW SHOGREN, OF SANDWICH, ILLINOIS.

IMPROVEMENT IN MACHINES FOR MAKING MACHINERY KEYS.

Specification forming part of Letters Patent No. 186,439, dated January 23, 1877; application filed June 19, 1876.

*To all whom it may concern:*

Be it known that I, ANDREW SHOGREN, of Sandwich, in the county of DeKalb and State of Illinois, have invented a new and useful Improvement in Machines for Making Machinery Keys, which is fully described in the following specification, reference being had to the accompanying drawings, in which—

Figure 1 represents a perspective view of the machine; Fig. 2, a side elevation of the same; Fig. 3, a longitudinal vertical section of the machine, as shown in Fig. 2; Fig. 4, a transverse vertical section, taken on the line $x\ x$, Fig. 2; Fig. 5, a detail plan view of the beater or swaging-cylinders; Figs. 6 and 7, detail views of the devices for adjusting the horizontal swaging-cylinder so as to taper the key; Fig. 8, a perspective view of the devices for holding the bar on the sliding table, and also the gage-plate; Fig. 9, a perspective view of the device for stopping and holding the sliding feed-table when it is drawn back, and Figs. 10 and 11 detail views of devices for stopping and starting the gearing by means of which the reciprocating table is drawn back.

My invention relates to a machine for rolling or forging crow-bars with either a true or an irregular taper, as may be desired, and particularly designed for the manufacture of keys for machinery.

The invention consists in supporting the horizontal beating-cylinder in a pivoted frame, so that it can be adjusted vertically to taper the rod as it is swaged. It also consists in the combination, with said pivoted frame, of a lever, provided with an inclined guideway, by means of which the necessary adjustment of the frame is effected to taper the forged bar. It also consists in the combination of this actuating-lever with the feed-plate, so that the lever is operated by the reciprocation of the latter. It also consists in making said actuating-lever jointed and adjustable, so that the inclination-pitch of the taper may be adjusted at will. It also consists in attaching the beating-rollers on the vertical cylinders by means of swaging plates or arms, so that this distance between the rollers may be adjusted and the latter may be readily removed. And it further consists in various devices and combinations of devices having certain subordinate functions in the operation of the machine, as will be hereinafter fully described and set forth.

In the drawings, A represents the main or supporting frame of the machine, which may be of any suitable construction, for receiving the different parts of the machine and holding them in place. A frame, B, is pivoted to suitable lugs or arms $a$, on one end of the main frame, and in this pivoted frame is mounted a horizontal shaft, C, which carries a beating or swaging cylinder, $c$, provided with a roller, $c^1$. This cylinder is driven from the main driving-shaft D, through an upright shaft, D′, by means of a bevel-gear, $d$, on the shaft D meshing with a corresponding wheel, $d^1$, on the lower end of the shaft D′, and a bevel-gear, $d^2$, on the upper end of the shaft D′, which meshes with a corresponding gear, $c^2$, on one end of the shaft C. The wheel $d^2$ is loose upon the shaft D′, so that it can slide thereon, and the latter is supported at its upper end in a bearing, $b$, which is rigidly connected to one arm of the frame B. The bearing $b$ being below the wheel $d^2$, whenever the frame B is raised or lowered, the wheels $c^2$ and $d^2$ are kept in gear, so that the rotation of the shaft C is not interrupted. Just below the shaft C, two upright shafts, E E, are mounted in the main frame, which are driven by bevel-gear wheels $e\ e$ on the lower ends, meshing with corresponding wheels $d^3$ on the main driving-shaft.

On the upper ends of the shafts E E are mounted disks E′, which carry beating or swaging rollers $e^1$, which are supported by bearings in swinging frames $e^2$, pivoted to the disks E′, as shown in Fig. 5 of the drawings, and are free to swing back and forth on their pivots. The disks E′ are recessed, as shown in Fig. 5 of the drawings, to accommodate the rollers $e^1$, and also to provide a support for a set-screw, $e^3$, by means of which the swaging-frames $e^2$ may be adjusted so as to regulate the distance between the rollers $e^1$. By mounting the rollers in frames pivoted to the disks, I am also enabled to readily replace either of these devices whenever it becomes necessary. On the main frame, arranged just below the opening between the disks E′, is a stationary anvil or bed-plate, $a'$, on which the bar is placed from which it is desired to forge the keys. A lever, F, is pivoted to the main frame at the end thereof, just below the swinging frame B, the pivoted end being forked or branching, so as to pass around the shafts E, to be attached at the extreme rear end of the main frame. A swinging arm, $f$, depends from the lever F, and is pivoted to a cross-bar, $F^1$, near the bottom of the frame, from each end of which an arm, $f^1$, extends upward, and is pivoted to the forward ends of the arms of the swinging frame B.

It is evident, therefore, that by vibrating the lever F the frame B will be correspondingly moved, thereby raising and lowering the horizontal beating or forging cylinder. To accomplish this the forward or free end of the lever F is provided with an inclined slot, $f^2$, in which a stud or pin is made to move horizontally, thus raising and lowering the forward end of the lever as it moves back and forth.

The lever F may be made in one piece; but I prefer to construct it in two parts, the forward piece $F^2$ being pivoted to the rear portion, so as to be adjusted in relation thereto.

A clasp or loop, $f^3$, is pivoted to a pendant on the rear section of the lever, and is made to embrace a similar pendant on the rear end of the front section of the same. In the end of this loop is a set-screw, $f^4$, and in the lower end of the rear pendant is another set-screw, $f^5$, which passes through and works against the pendant on the front section of the lever. It is evident that by adjusting this attachment by means of the set-screws the relation of the front section $F^2$ to the rear section of the lever F will be changed, thereby changing the inclination of the slot $f^2$, making its pitch greater or less, as may be desired.

A feed-table, G, is mounted upon suitable ways on the main frame, so as to slide back and forth thereon freely. Upon the lower side of this table is a slotted pendant, $g$, and in the slot is fixed a pin or stud, $g^1$, which is inserted in the inclined slot, $f^2$, in the lever F, and is made to move back and forth therein by the reciprocation of the feed-table G. The pin $g^1$ is adjustable vertically in the pendant, so as to accommodate the adjustment of the lever-section $F^2$. The feed-table is drawn forward toward the forging-cylinders by a weight, H, attached to a cord or chain, $h$, running over a pulley, $h'$, at the rear of the machine, and extending forward and attached to the table. The table is drawn back from the cylinders by means of a pinion, $i$, which engages with a rack, $g^2$, on the under side of the feed-table. The pinion $i$ is on a shaft, $i^1$, on one end of which is loosely mounted a gear-wheel, I, meshing with a pinion on a shaft, $I'$, which is driven from the main driving-shaft D.

On the shaft $i^1$ is a sliding clutch, $i^2$, which is moved back and forth to engage with and disengage from clutch-teeth on the hub of the wheel I, so as to produce an intermittent rotation of the shaft $i^1$ and pinion $i$.

A bell-crank lever, J, is pivoted to a support on the main frame, and has its outer end forked so as to embrace the clutch $i^2$ in a groove thereon. A sliding rod, $j$, is attached to the other end of the lever J, and extends to the front end of the machine, in the end piece of which it is loosely supported. An eye, $j^1$, depending from the forward end of the feed-table embraces the rod $j$, and on the rod are stops $j^2$, against which the eye strikes as the table is reciprocated, the stops being arranged so that when the table is thrust forward toward the forging-cylinders the wheel I is clutched to its shaft, so that the backward motion of the table is commenced immediately, and continued until the table reaches the front end of the machine, when the pendant $j^1$, striking against the front stop $j^2$, pulls forward the rod J, disengages the clutch $i^2$, and the table stops.

The front stop $j^2$ is adjustable on the rod J, and behind the corresponding rear stop is placed a cushioning-spring, $j^3$. A holding-spring, $j^4$, attached to the bottom of the feed-table, rests against the inner end of the clutch lever J.

On the feed-table G is a rest or support, K, for the bar, just above which is suspended a swinging cam, $k$, pivoted to a post, $k^1$, attached to the feed-table. On the table G is also a pivoted lever, $K'$, the outer end of which is bent to form a handle, while the inner end is bent in the opposite direction, and is attached by a link, $k^2$, to a projection on the cam $k$.

It will thus be seen that by moving the lever $K'$, the cam $k$ is oscillated upon its pivot, so as to gripe the bar between its face and the rest K, or release the bar from this holding device at pleasure.

A stop-spring, L, is attached to the main frame of the machine, and is provided with a stud or stop, $l$, which projects up through a slot in the face of the frame. On the table G is a projecting arm, $l^1$, which extends out beyond the table at one side, so as to depress the spring L when it comes in contact with the stop $l$ on the backward movement of the feed-table, until it passes said stop, when the latter is immediately forced up by the spring in front of the arm $l^1$, and holds the feed-table from forward movement by the action of the weight H.

On the free end of the spring L is a key, $l^2$, which extends up through the frame-plate, so that by depressing it the arm $l^1$ is released, and the feed-table is free to move forward.

The pendant $f$ is hung upon an eccentric pin, M, journaled in the lever F, and upon one end of the pin is a crank-arm, $m$, rigidly attached thereto. A rod, $M'$, is attached to this crank-arm, and extends to the front end of the machine, being supported loosely in a hanger, $m^1$, on the under side of the feed-table, so that the hanger slips along over the rod as the feed-table is reciprocated back and forth. On the outer end of the rod is an adjustable stop, $m^2$, against which the hanger $m^1$ strikes when the feed-table is drawn back to the front end of the machine, thereby pulling forward the crank $m$, and turning up the eccentric pin M, so as to pull up the pendent arm $f$, thereby raising to a still greater height the cross-bar $F^1$, and through it the horizontal forging-cylinder $c$. A cushioning-spring, $m^3$, is placed upon the rod M′, which relieves the shock of the feed-table as it is pulled forward by the weight and aids in throwing the eccentric back, so as to lower the vibrating frame to a working position. A bar, N, is pivoted to the cross-piece $F^1$, and extends upward between the two branches of the lever F, near a stop, $n$, thereon. Behind this bar is a pressure-spring, $n^1$, which forces the bar N up against the stop $n$. The upper end of the bar N is notched, and when the cross-bar $F^1$ is raised by the eccentric M, as heretofore described, the notch $n^2$ engages with the stop $n$ so that the cross-bar and horizontal beater-shaft are held in an elevated position. A short stud, $n^3$, projecting from the rear end of the feed-table, strikes against the upper projecting end of the arm N, when the table is pulled forward to the forging-cylinders, disengages it from the stop $n$, and the cross-bar $F^1$ drops from the weight of the frame upon it, the eccentric M being so arranged that it is never turned up so as to stand upon a dead-center by the drawing forward of the rod M′, as described.

This arrangement of the eccentric, and other devices connected therewith, is clearly shown in Figs. 6 and 7 of the drawings, in which the former represents the cross-bar and forging shaft in an elevated position, and the latter the same position in dotted lines, and the working position after the rolling frame has been allowed to drop in full lines.

A pin, $m^4$, on the lever F stops the backward movement of the crank-arm $m$, thereby preventing the turning of the eccentric so as to permit the cross-bar $F^1$ to fall below a certain fixed position. A rock-shaft, O, is supported in standards $o$, placed on the main frame by the side of the way, along which the feed-table moves. These arms are bent, as shown in the drawings, so as to bring the rock-shaft over the feed-table. A small bent rod, $o'$, is attached to the rock-shaft O so as to be parallel with it, and under this rod the inner bent end of the rocking lever K′ passes, so that when said lever is rocked so as to turn down the cam $k$, the rod $o'$ is thrown up, and vice versa. On the end of the rock-shaft O, nearest the forging-cylinders, is a gage-arm, O′, which vibrates up and down when the shaft O is rocked by the action of the lever K′, described above. The gage O′ may be adjustable on the rock-shaft O.

At one side of the main frame of the machine are cutting-shears P, the pivoted blade $p$ of which is vibrated by the pitman $p'$, connecting the blade P with a crank-wheel, Q, on a shaft, $q$, driven by a suitable gearing from the shaft I. A driving-pulley is mounted upon the main driving-shaft D, by means of which motion is communicated by any suitable mechanism to the machine, or the shaft D may be driven in any other suitable manner.

The operation of my machine is as follows: The feed-table being drawn back to the forward end of the machine, the several parts will be in the position shown in Figs. 3 and 6 of the drawings, and the horizontal forging-cylinder will be raised so high above the anvil that the rod or bar from which the keys are to be forged can be thrust in underneath the cylinder without difficulty. The bar S is then placed upon the feed-table, thrust forward to the gage O′, which is turned down in front of the anvil, and secured in position by turning the clamp K down upon it, which, at the same time, raises the gage out of the way. The feed-table is then released by depressing the stop-spring L, and is suddenly pulled forward by the weight H, carrying the bar S onto the anvil $a'$, underneath the cylinder $c$, and between the disks E′. At the proper moment the stud $n^3$ releases the arm N from the stop $n$, and the forging-cylinder $c$ drops down into working position. Simultaneously the wheel I is clutched to the shaft $i^1$ by the mechanism described above, and the feed-table G commences to move backward, drawing back with it the bar S, which is forged into the desired shape as it is drawn back by the operation of the revolving beater-rollers $c^1$ and $e^1$. As the pin on the feed-table moves back in the inclined slot in the lever F, the horizontal forging-shaft is gradually depressed, so that the key will be beaten out or forged with a taper. When the table is moved to the extreme forward end of the machine and stopped, as heretofore described, the bar is released and moved to the shears at one side of the frame, the key is cut off, the bar is again secured in position, and the foregoing operation is repeated.

By adjusting the stud or pin $g^1$ in the pendant $g$, and by adjusting the pivoted slotted section of the lever F, the inclination of the taper is varied.

Having thus described my invention, what I claim as new, and desire to secure by Letters Patent, is—

1. The combination of the pivoted frame B and horizontal forging-cylinder mounted thereon, substantially as and for the purpose set forth.

2. The combination of a pivoted cylinder-frame, B, and a pivoted lever, F, connected to said frame, so that the vibration of the lever will also vibrate the frame, substantially as described.

3. The combination of the pivoted cylinder-frame B, cross-bar $F^1$, connecting-arms $f^1$, pivoted lever F, substantially as described.

4. The lever F, provided with an inclined slot, $f^2$, in combination with a pin moving back and forth in the slot horizontally, and the pivoted cylinder-frame B, substantially as described.

5. The lever F, constructed of two sections, one of which sections, $F^2$, is slotted and adjustably connected to the other, substantially as and for the purpose set forth.

6. The combination of the two sections of the lever F, the clasp or loop $f^3$, and set-screws $f^4$ and $f^5$, substantially as described.

7. The combination of a sliding feed-table, stud or pin connected thereto, and pivoted lever F, provided with an inclined slot, substantially as described.

8. The combination of the sliding feed-table G, slotted pendant $g$, adjustable stud $g^1$, and lever F, provided with an inclined slot, substantially as described.

9. The combination of the cross-bar $F^1$, connected to the pivoted cylinder-frame, lever F, connecting-rod $f$, and eccentric M, substantially as described.

10. The combination of the cylinder-frame B, cross-bar $F^1$, connecting-rod $f$, eccentric M, spring stop-lever N, lever F, rod M', and sliding feed-table G, substantially as described.

11. The combination of the free pivoted frames $e^2$, carrying the rollers $e^1$ and disks E', substantially as described.

12. The combination of the disks E', pivoted frames $e^2$, rollers $e^1$, and set-screws $e^3$, substantially as described.

13. The combination of the disks E', adjustable roller-frames $e^2$, horizontal forging-cylinder $c$, and stationary anvil $a'$, substantially as described.

14. The feed-table G, provided with a rack, $g^2$, shaft $i$, having a pinion, $i^1$, wheel I, clutch $i^2$, lever J, and sliding rod $j$, substantially as and for the purpose set forth.

15. The combination of the rock-shaft O, provided with rod $o'$, gage-arm O', and bent rocking lever K', substantially as described.

16. The combination of the rock-shaft O, gage-arm O', mounted thereon, bent rocking lever K', and holding-cam $k$, substantially as described.

ANDREW SHOGREN.

Witnesses:
L. A. BUNTING,
L. M. HARRIS.